April 19, 1927.  1,625,418
C. F. MATTINGLY
HYDRAULIC BRAKE
Filed Dec. 29, 1923   2 Sheets-Sheet 2
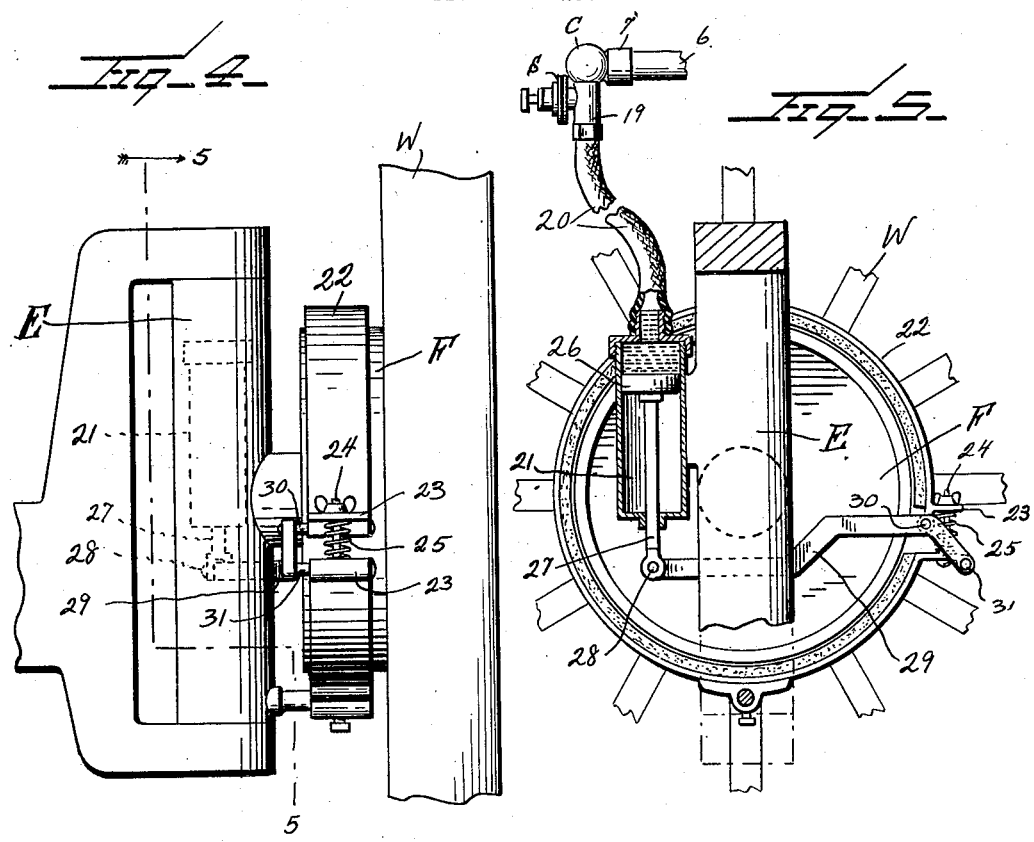
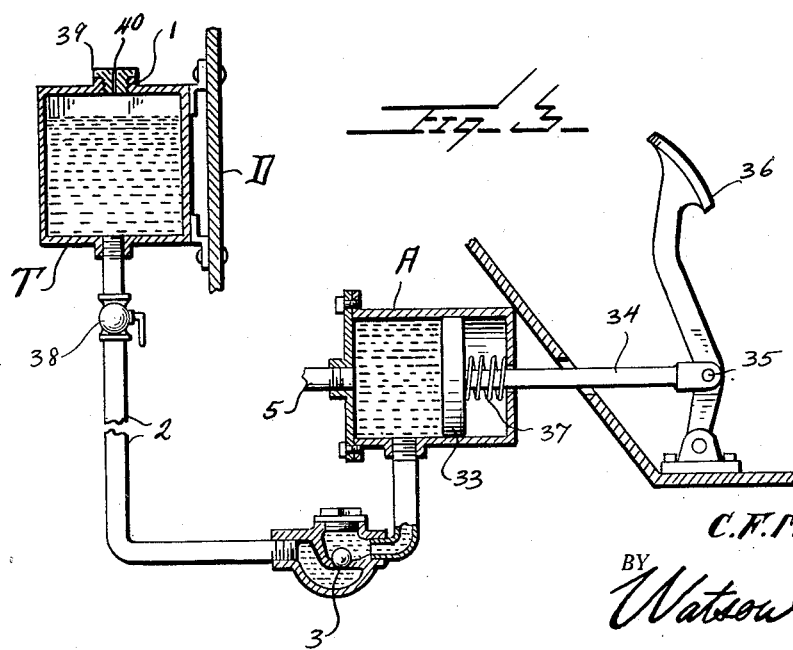
INVENTOR.
C. F. Mattingly
BY Watson E. Coleman
ATTORNEY.

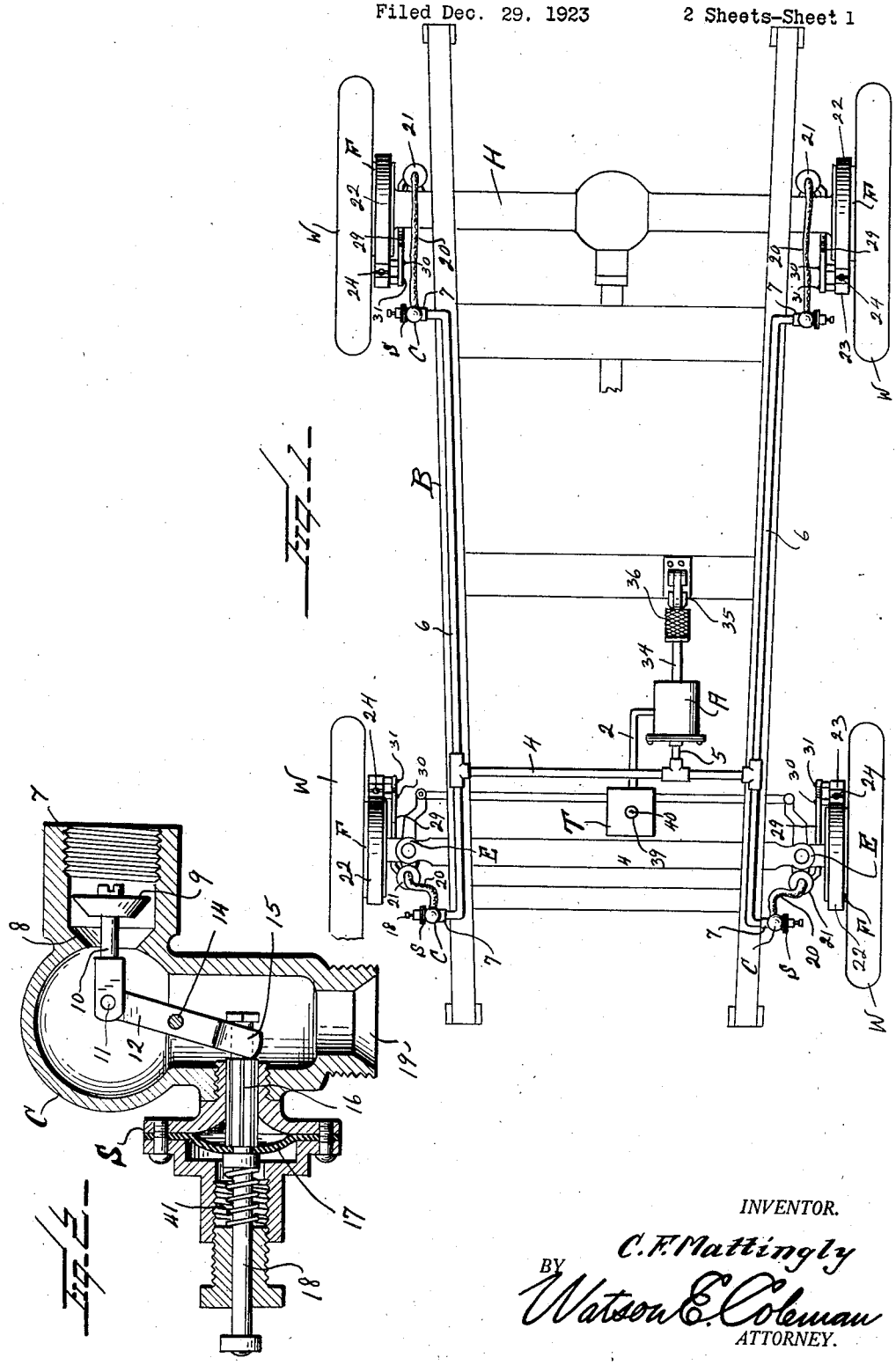

Patented Apr. 19, 1927.

1,625,418

UNITED STATES PATENT OFFICE.

CHARLES F. MATTINGLY, OF ST. LOUIS, MISSOURI, ASSIGNOR TO MATTINGLY AUTOMATIC VALVE CO., OF ST. LOUIS, MISSOURI, A CORPORATION OF MISSOURI.

HYDRAULIC BRAKE.

Application filed December 29, 1923. Serial No. 683,471.

This invention relates to certain improvements in hydraulic brakes and has relation more particularly to a device of this general character especially designed and adapted for use in connection with motor driven vehicles and it is an object of the invention to provide a mechanism of this general character embodying novel and improved means whereby the braking action is effected upon all of the supporting wheels for the vehicle.

It is also an object of the invention to provide a mechanism of this general character embodying novel and improved means whereby the fluid is automatically supplied as needed together with means to automatically close the flow through the line of a mechanism or system in the event of such line becoming ruptured or disconnected thereby preventing the escape of the fluid from the entire mechanism or system through the resultant aperture.

The invention consists in the details of construction and in the combination and arrangement of the several parts of my improved hydraulic brake whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan but of a somewhat diagrammatic character illustrating a hydraulic brake constructed in accordance with an embodiment of my invention;

Figure 2 is an enlarged fragmentary sectional view illustrating in detail one of the valves as herein employed;

Figure 3 is a diagrammatic view partly in section and partly in elevation illustrating the master cylinder and the parts concomitant thereto;

Figure 4 is a fragmentary elevational view of a brake as employed in connection with the steering wheel of a vehicle;

Figure 5 is a sectional view taken substantially on the line 5—5 of Figure 4 looking in the direction of the arrow and showing the brake cylinder in section.

As disclosed in the accompanying drawings, T denotes a supply tank of requisite dimensions and which is mounted on the dash D or other convenient point upon a vehicle body, said tank T being provided with a filling vent 1. The tank T feeds by gravity through the tube 2, preferably of copper, to the master cylinder A preferably supported by the body in advance of the foot board. The tube 2 has interposed therein at a point in relatively close proximity to the master cylinder A the check valve 3 preferably of a ball type, said valve opening inwardly relative to the cylinder A.

Extending transversely of the body B of the vehicle is a conduit 4 having its central portion in communication with the master cylinder A by the branch conduit 5. The extremities of the conduit 4 are in communication with the conduit 6 disposed lengthwise of the body B at opposite sides thereof, each end portion of said conduit being coupled to the induction end portion 7 of the casing C.

The casing C is comprised in the automatic valve structure and the portion 7 thereof is provided with an internal valve seat 8 with which coacts the valve 9 carried by the stem 10. The stem 10 is operatively engaged, as at 11, with an end portion of a link 12. The link 12 substantially intermediate its ends is supported, as at 14, for swinging movement and has its opposite end portion operatively engaged, as at 15, with a stem 16.

S denotes a supplemental casing carried by the casing C and in communication with said casing. Intersecting the chamber of the casing S is a diaphragm 17 to the central portion of which is secured the stem 16, said stem being of a length to extend within the casing C to effect the desired operative connection with the link 12. The stem 16 has associated therewith the stem or rod 18 providing means whereby the stem 16 may be manually adjusted.

The form of valve herein disclosed is described in detail and claimed in my application for patent filed December 22, 1923, Serial No. 682,241.

In communication with the eduction end portion 19 of the casing C is a hose or flexible conduit 20 in communication with the brake cylinder 21. The brake cylinder 21 is operatively supported by the rear housing H immediately adjacent to the brake drum of a rear wheel and said cylinder is carried by a spindle bushing E comprised in the mounting of a front steering wheel. Each of the wheels W has suitably secured thereto a brake drum F with which is associated a brake band 22.

The extremities of the band 22 terminate in the outstanding ears 23 slidably engaged with the bolt 24. Interposed between the ears 23 and surrounding the bolt 24 is an expansion spring 25.

Working within the cylinder 21 is a piston 26 connected to an outwardly extending stem 27 operatively engaged, as at 28, with a brake lever 29, said lever 29 being pivotally connected, as at 30 and 31, with the opposite end portions of the band 22 whereby outward movement of the piston 26 serves to contract the band 22 into tight frictional contact with the brake drum F and thereby braking the adjacent wheel W. As the band 22 is contracted the spring 25 is placed under tension for a purpose to be hereinafter more particularly referred to.

Working in the cylinder A is a piston 33 engaged with the stem 34 extending exteriorly of the master cylinder A, said stem being also operatively engaged, as at 35, with the pedal 36. Interposed between the piston 33 and the outer head of the cylinder A is a spring 37 encircling the stem 34, said spring operating to exert slight pressure upon the piston 33 when the brakes are in release.

When it is desired to apply the brakes, pressure is imposed upon the pedal 36 moving the same forward and which action causes the piston 33 to move forwardly in the cylinder A. As the fluid in the master cylinder A and the various conduits and tubes has no means of escape, such pressure exerted on the fluid by the piston 33 will be immediately transmitted to the pistons 26 outwardly and thereby contracting the brake bands 22 and thereby effecting equal retardation to the rotating movement of all of the wheels and at the same time resulting in the vehicle being brought quickly to a standstill without skidding.

When the pressure is released from the pedal 36 the compressed springs 25 will immediately begin to expand forcing the bands 22 away from the drums F and at the same time moving the levers 29 in a direction to cause the pistons 26 to move inwardly of their cylinders 21. This inward movement of the pistons 26 forces the fluid back to the master cylinder A at the same time forcing the piston 23 back and in contact with the spring 37. The purpose of the spring 37 is to maintain a slight pressure on the fluid to eliminate lost motion and to assure a quick application of the brakes when necessary.

By pulling back on the pedal 36 the piston 33 will be caused to compress the spring 37 and at the same time create a partial vacuum in the cylinder A. This action will cause the fluid within the supply tank T to force the check valve 3 from its seat whereby the cylinder A is properly filled and upon release of the pedal 36 the spring 37 will expand and create slight pressure in said cylinder A which will hold the check valve 3 firmly to its seat to prevent the fluid being forced back into the supply tank T. During this operation the valves 9 are closed.

It is also to be understood that when the pressure in the system, including the master cylinder A, is decreased below a certain degree the pressure valve 9 in each brake will close.

Interposed in the tube 2 is a stop cock 38 which is normally in full open position but is adapted to close the flow through said tube 2 in case the valve 3 should stick or fail to seat.

The filling vent 1 has engaged therewith a plug 39 which is provided with an opening 40 to permit air to be admitted within the tank T above the fluid supply therein.

When pressure is exerted in the cylinder A such pressure is immediately felt throughout the entire system including the inner side of the diaphragm 17 and the inner end of the spring 41. This pressure against the diaphragm and the spring 41 holds them outwardly and at the same time maintains the main valve 9 off its seat 8 against the flow of fluid which may be passing through the hose 20. Should the hose 20 become ruptured or otherwise ineffective, this equilibrium of pressure will be destroyed by the sudden outrush of fluid through the eduction end portion 19 of the casing C. This action increases the velocity of the fluid against the valve 9 and forces it to its seat to stop the flow through the casing.

When the brake pedal 36 is released in ordinary service, the springs 25 at the wheels will move the pistons 26 in a direction to force the fluid back through the hose 20 against the valve 9 which is normally off its seat 8 and thus it will be seen that it is impossible for the valve 9 to be closed when the brake is set.

Under normal conditions, the pressure of the fluid passing through a valve coacts with the diaphragm 17 to maintain the valve 9 open. When the valve 9 is open the spring 41 within the casing S is placed under compression so that upon reduction of pressure in the hose or flexible conduit 20, the spring 41 will operate to automatically move the valve 9 to its seat. To facilitate this operation, the area around the valve 9 is somewhat smaller than the area of the passageway through the hose or flexible member 20 so that in the event of such hose or conduit becoming ruptured the fluid can escape through the rupture faster than it can be admitted past the valve 9.

From the foregoing description it is thought to be obvious that a hydraulic brake constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In a fluid brake system, the combination of a set of brake cylinders and pistons, a master cylinder and a piston, connections leading from said master cylinder to said brake cylinders, a pressure valve interposed at each brake cylinder connection, means of maintaining said pressure valves in an open position, and means for automatically closing said valves upon reduction of the pressure below a predetermined degree in the master cylinder.

In testimony whereof I hereunto affix my signature.

CHARLES F. MATTINGLY.